US012793735B1

(12) United States Patent
Seigler et al.

(10) Patent No.: US 12,793,735 B1
(45) Date of Patent: Nov. 10, 2026

(54) HEAT-ASSISTED MAGNETIC RECORDING HEAD HAVING A DIELECTRIC COMPOSITION AS BUILDUP ON A PEG OF A NEAR-FIELD TRANSDUCER, AND RELATED METHODS OF MAKING

(71) Applicant: Seagate Technology LLC, Fremont, CA (US)

(72) Inventors: Michael Allen Seigler, Eden Prairie, MN (US); Scott Michael Franzen, Lakeville, MN (US); Lifu Zhou, Eden Prairie, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 19/323,146

(22) Filed: Sep. 9, 2025

(51) Int. Cl.
*G11B 5/41* (2006.01)
*G11B 5/455* (2006.01)
*G11B 5/00* (2006.01)

(52) U.S. Cl.
CPC ................ *G11B 5/41* (2013.01); *G11B 5/455* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 7,495,856 | B2 | 2/2009 | Payne et al. | |
| 8,221,192 | B2 * | 7/2012 | Kashiwase | G11B 5/3136 451/63 |
| 8,395,974 | B1 | 3/2013 | Shimazawa et al. | |
| 8,902,720 | B1 * | 12/2014 | Schreck | G11B 5/3106 369/13.13 |
| 9,036,307 | B1 * | 5/2015 | Hoshiya | G11B 5/3903 360/59 |
| 9,147,414 | B2 | 9/2015 | Seigler et al. | |
| 9,704,529 | B1 | 7/2017 | Lou et al. | |
| 9,875,764 | B1 | 1/2018 | Riddering | |
| 9,990,950 | B1 | 6/2018 | Mader et al. | |
| 10,614,850 | B1 * | 4/2020 | Jones | C23C 28/30 |
| 10,950,266 | B1 | 3/2021 | Rajuria et al. | |
| 11,222,657 | B1 * | 1/2022 | Seigler | G11B 5/6076 |
| 11,331,765 | B1 | 5/2022 | Sherve et al. | |
| 11,389,924 | B2 | 7/2022 | Rejda et al. | |
| 11,691,242 | B2 | 7/2023 | Rejda et al. | |
| 11,763,847 | B1 | 9/2023 | Ellison et al. | |

OTHER PUBLICATIONS

U.S. Appl. No. 19/323,146, filed Sep. 13, 2025, Liu et al.
U.S. Appl. No. 19/388,564, filed Nov. 13, 2025, Seigler et al.

* cited by examiner

*Primary Examiner* — Fred Tzeng
(74) *Attorney, Agent, or Firm* — Mueting Raasch Group

(57) ABSTRACT

Methods of burnishing to remove material from the air-bearing surface under a near-field transducer and form a burnished surface, and applying power to a laser so that laser light exits from a near-field transducer onto the surface of the magnetic recording medium at a radial location that is different from where burnishing occurred to grow a layer of a dielectric material on the burnished surface; and evaluating a writing performance of the write transducer after growing the dielectric material.

20 Claims, 4 Drawing Sheets

HEAT-ASSISTED MAGNETIC RECORDING HEAD HAVING A DIELECTRIC COMPOSITION AS BUILDUP ON A PEG OF A NEAR-FIELD TRANSDUCER, AND RELATED METHODS OF MAKING

BACKGROUND

The present disclosure relates to writing performance of a write transducer of a heat-assisted magnetic recording head. There is a continuing need to manage the writing performance of a write transducer of a heat-assisted magnetic recording head.

SUMMARY

The present disclosure includes embodiments of a method that includes:

applying power to a writer heater proximal to a write transducer in a heat-assisted magnetic recording head to protrude a region of an air-bearing surface under a near-field transducer in a media-facing direction toward a magnetic recording medium;

contacting the air-bearing surface under the near-field transducer with a surface of the magnetic recording medium under pressure for a first time period while the magnetic recording medium is rotating to remove material from the air-bearing surface under a near-field transducer and form a burnished surface;

applying power to a laser of the heat-assisted magnetic recording head so that laser light exits from the near-field transducer onto the surface of the magnetic recording medium for a second time period while the magnetic recording medium is rotating to grow a layer of a dielectric material on the burnished surface; and after the second time period, evaluating a writing performance of the write transducer.

The present disclosure also includes embodiments of a data storage device that includes:

at least one heat-assisted magnetic recording head;

at least one magnetic recording medium configured to store data in a plurality of data tracks;

a controller operably connected to the at least one heat-assisted magnetic recording head and configured to control operations of the data storage device;

a memory operably connected to the controller, the memory storing program instructions; and the program instructions, when executed by the controller, cause the controller to:

apply power to a writer heater proximal to a write transducer in the at least one heat-assisted magnetic recording head to protrude a region of an air-bearing surface under a near-field transducer in a media-facing direction toward the at least one magnetic recording medium;

contact the air-bearing surface under the near-field transducer with a surface of the at least one magnetic recording medium under pressure for a first time period while the at least one magnetic recording medium is rotating to remove material from the air-bearing surface under a near-field transducer and form a burnished surface;

apply power to a laser of the at least one heat-assisted magnetic recording head so that laser light exits from the near-field transducer onto the surface of the at least one magnetic recording medium for a time period while the at least one magnetic recording medium is rotating to grow a layer of a dielectric material on the burnished surface; and after the second time period, evaluate a writing performance of the write transducer.

BRIEF DESCRIPTION OF THE DRAWINGS

The discussion below references the following figures, wherein the same reference number may be used to identify the similar/same component in multiple figures. The schematic figures are for illustration purposes and are not necessarily drawn to scale.

DETAILED DESCRIPTION

The present disclosure relates to near-field transducers in heat-assisted magnetic recording heads. There is a continuing need for providing near-field transducers having dielectric buildup. As discussed in detail further below, the present disclosure includes an "NFT buildup reset" process of growing dielectric composition as buildup on an NFT.

The present disclosure relates to read/write heads used in heat-assisted magnetic recording (HAMR), also referred to as thermally-assisted recording (TAR), thermally-assisted magnetic recording (TAMR), energy-assisted magnetic recording (EAMR), etc. In this disclosure the terms "read/write head," "slider," "magnetic recording head," and "head" are used interchangeably. In a HAMR device, a read/write head includes an energy source (e.g., a laser diode) that heats a recording medium during writing. The HAMR read/write head has an optical transmission path that includes a waveguide and near-field transducer, which shape and direct the energy from the energy source to the recording medium.

A laser diode can be included with a heat-assisted magnetic recording head using a variety of approaches. Laser on Slider (LOS) read/write heads and On-Wafer Laser (OWL) read/write heads are two different approaches for including read/write heads of hard disk drives with laser diodes, specifically for use in Heat-Assisted Magnetic Recording (HAMR) technology. Both involve the use of laser diodes to heat the magnetic, recording media during the writing process to allow for higher data storage densities. LOS involves directly mounting the laser diode onto the slider of the read/write head, while OWL fabricates the laser diode on a separate or source substrate (wafer) and transfers it to the slider or target substrate (wafer), before further processing the target substrate into individual read/write heads.

Figure 1:
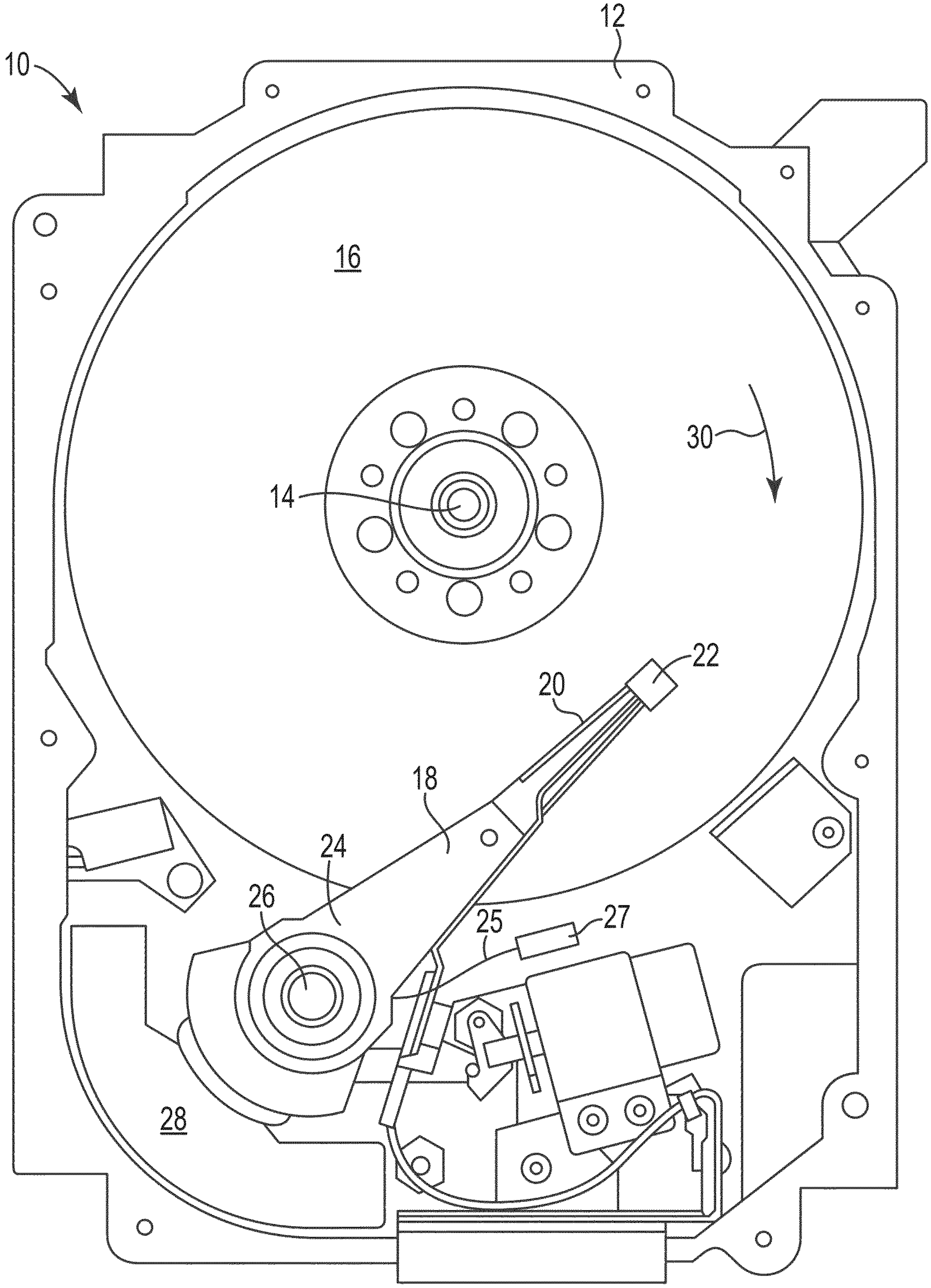
FIG. 1 is a schematic diagram of an example of a portion of a data storage device that can be used with a heat-assisted magnetic recording head having dielectric buildup on a near-field transducer according to the present disclosure.
Figure 2:
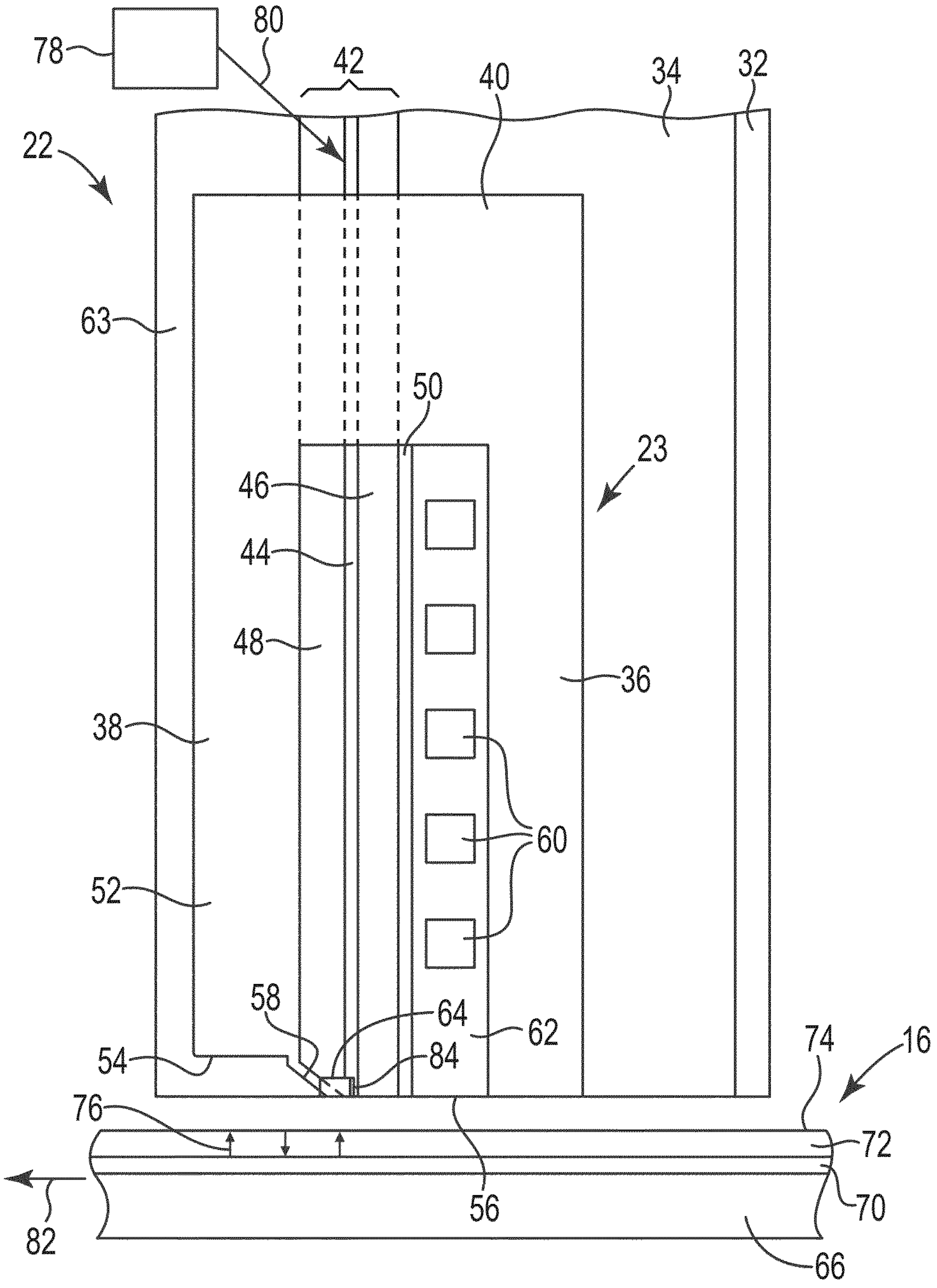
FIG. 2 shows a schematic diagram of a portion of a heat-assisted magnetic recording head that can have dielectric buildup on a near-field transducer according to the present disclosure.

FIGS. 1 and 2 are non-limiting examples illustrating a data storage device 10 (e.g., hard disk drive (HDD)) that includes a heat-assisted magnetic recording head 22 and magnetic recording medium 16 that can be used with methods according to the present disclosure.

In more detail, FIG. 1 depicts a data storage device 10 includes a housing 12 (with the upper portion removed and the lower portion visible in this view) sized and configured to contain the various components of the disk drive. The disk drive includes a spindle motor 14 for rotating at least one magnetic recording medium 16 configured to store data in a plurality of data tracks (e.g., a magnetic disk) within the housing. At least one arm 18 may be contained within the housing 12, with each arm 18 having a first end 20 and a second end 24. In some cases, the first end 20 may include a heat-assisted magnetic recording head 22. In some cases, a second end 24 may be pivotably mounted on a shaft by a bearing 26. An actuator motor 28 may be located at the arm's second end 24 for pivoting the arm 18 about a pivot point to position the heat-assisted magnetic recording head 22 over a desired sector of the magnetic recording medium 16. The actuator motor 28 is controlled via system 27, which is described below. The magnetic recording medium 16 rotates in the direction indicated by arrow 30. As the magnetic recording medium 16 rotates, heat-assisted magnetic recording head 22 may be configured to fly over a surface of magnetic recording medium 16 on an air bearing between heat-assisted magnetic recording head 22 and the surface of magnetic recording medium 16.

For heat assisted magnetic recording (HAMR), an electromagnetic wave of, for example, visible, infrared or ultraviolet light may be directed onto a surface of magnetic recording medium 16 to raise the temperature of a localized area on a surface of magnetic recording medium 16 to facilitate switching of the magnetization of that area. Some designs of HAMR heads include a thin film waveguide to guide light to the magnetic recording medium 16 for localized heating of the magnetic recording medium 16. To direct light into the waveguide, a grating coupler may be used.

In some examples, the magnetic recording medium 16 may include a magnetic recording layer, a carbon overcoat layer, and a lubricant layer. In some cases, the present techniques include depositing a lubricant solution on an outer surface of storage medium 16.

Data storage device 10 includes head circuitry 25 that is electrically coupled to system 27, which includes a controller and memory. The controller is operably connected to each heat-assisted magnetic recording head and configured to control operations of the data storage device. The memory is operably connected to the controller and stores program instructions to be executed.

FIG. 2 is a side elevation view of one embodiment of a heat-assisted magnetic recording head 22 constructed in accordance with an aspect of the disclosure and positioned near magnetic recording medium 16. The heat-assisted magnetic recording head 22 includes a substrate 32 and a base coat 34 on the substrate. The heat-assisted magnetic recording head 22 has a writer for "writing" data to magnetic recording medium 16. The writer includes a bottom pole 36 on the base coat, and a top pole 38 that may be magnetically coupled to the bottom pole through a yoke or pedestal 40. In the illustrated example, a waveguide 42 may be positioned between the top and bottom poles. The waveguide includes a core layer 44 and cladding layers 46 and 48 on opposite sides of the core layer. A mirror 50 may be positioned adjacent to one of the cladding layers. The top pole may be a two-piece pole that includes a first portion, or pole body 52, having a first end 54 that is spaced from the air-bearing surface 56, and a second portion, or sloped pole piece 58 (also referred to as a write pole 58), extending from the first portion and tilted in a direction toward the bottom pole. The second portion may be structured to include an end adjacent to the air-bearing surface 56 of the heat-assisted magnetic recording head 22, with the end being closer to the waveguide than the first portion of the top pole. A planar coil 60 may extend between the top and bottom poles and around the pedestal. In the illustrated example, the top pole may serve as a write pole and the bottom pole as a return pole.

In some cases, insulating material 62 may separate the coil turns. In one example, the substrate may be AlTiC, the core layer may be $Ta_2O_5$, and the cladding layers (and other insulating layers) may be $Al_2O_3$. A top layer of insulating material 63 may be formed on the top pole. A heat sink 64 may be positioned adjacent to the write pole 58, which is sloped. The heat sink may be comprised of a non-magnetic material, such as for example Au.

As illustrated in FIG. 2, heat-assisted magnetic recording head 22 may include a structure for heating the magnetic recording medium 16 proximate to where the write pole 58 applies the magnetic write field to the magnetic recording medium 16. In the illustrated example, the magnetic recording medium 16 includes a substrate 66, a heat sink layer 70, a magnetic recording layer 72, and a protective layer 74. However, other types of media, such as bit patterned media may be used. A magnetic field produced by current in the coil 60 may be used to control the direction of magnetization of bits 76 in the recording layer of the media.

In the example, the magnetic recording medium 16 is positioned adjacent to or under the heat-assisted magnetic recording head 22. The waveguide 42 is configured to guide optical energy 80 from energy source 78 of electromagnetic radiation, which may be, for example, ultraviolet, infrared, or visible light. The energy source may be, for example, a laser diode, or other suitable laser light source for directing a light beam (also referred to as optical energy 80) toward the waveguide 42. Various techniques that are known for coupling the light beam 80 into the waveguide 42 may be used. Once the light beam 80 is coupled into the waveguide 42, the light propagates through the waveguide 42 toward a truncated end of the waveguide 42 that is formed adjacent the air-bearing surface (ABS) of the heat-assisted magnetic recording head 22. Light exits the end of the waveguide and heats a portion of the media, as the media moves relative to the recording head as shown by arrow 82. A near-field transducer 84 (NFT) is positioned in or adjacent to the waveguide and at or near the air-bearing surface. Near-field transducer 84 is coupled to the waveguide 42 to receive optical energy 80 from the energy source 78. The heat sink material may be chosen such that it does not interfere with the resonance of the NFT.

Figure 4:
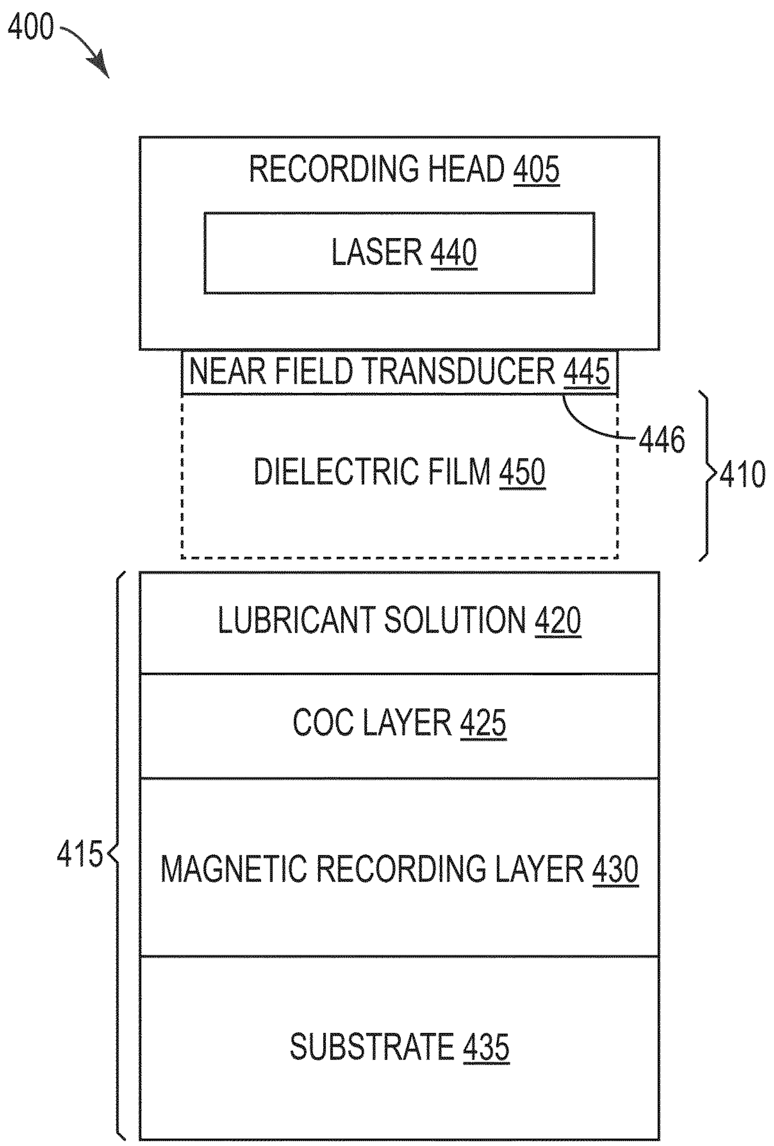
FIG. 4 shows a block diagram of media layers of a magnetic recording medium, and one embodiment of a heat-assisted magnetic recording head having dielectric buildup on a near-field transducer according to the present disclosure.

During the operational life of a data storage device such as a hard-disk drive (HDD), material can grow and form buildup (BU) at the air-bearing surface under the near-field transducer (NFT), especially while the laser is on and the magnetic recording head is writing. Referring to FIG. 4, this location of the BU can be referred to as the "near-field/media interface" or gap 410 (NMI). This BU material can vary in composition and can vary in shape and/or size relative to the portion of the NFT (peg) at the air-bearing surface. Depending on the combination of material composition and size/shape of the BU, the writer performance can be either improved or degraded. For example, some BU material such as a dielectric compound (e.g., $SiO_2$) can benefit the performance of the NFT and can be desirable to have. On the other hand, some materials are considered contaminants and can negatively impact one or more of areal density capability (ADC), thermal gradient (TG), adjacent-track interference (ATI), laser power (Ieff), etc. At least some of these contaminants can include carbonaceous deposits that form due to extreme local heating near the NFT. These contaminants can be relatively difficult to remove.

According to one aspect of the present disclosure, an "NFT buildup reset" process can be executed to modify the buildup. By removing "contaminated" buildup and replacing it with "fresh" dielectric material more favorable laser powers can be utilized, which can advantageously extend the operational life of a corresponding heat-assisted magnetic recording head.

At a desired time during the operational life of a corresponding hard disk drive, an NFT buildup reset process can begin with removing at least a portion of the buildup. Removing buildup includes "burnishing" a localized region or area of the air-bearing surface below the NFT (e.g., below the peg portion of the NFT) of a corresponding a heat-assisted magnetic recording head.

A non-limiting example of an "NFT buildup reset" process according to the present disclosure will be described with respect to FIGS. 3 and 4. As used herein, the direction along x-axis is referred to as the cross-track direction; the direction along the y-axis is referred to as the stripe-height direction (the (−) y-axis direction is the media-facing direction); and the direction along the z-axis is referred to as the down-track direction. In more detail, the cross-track direction is perpendicular to the tracks on a magnetic storage medium 320 that underlies and rotates relative to heat-assisted magnetic recording head 302. The cross-track direction is aligned with the lateral movement of the heat-assisted magnetic recording head 302 if it switched from writing (or reading) on one track to another. The down-track direction is parallel to the tracks on the magnetic storage medium 320 and is aligned with the rotational motion of the magnetic storage medium 320.

Burnishing according to the present disclosure can include causing a localized region or area of the air-bearing surface below the NFT (e.g., below the peg portion of the NFT) of a corresponding a heat-assisted magnetic recording head to protrude toward an underlying magnetic recording medium while it is rotating. In some embodiments, causing an NFT to protrude in such a manner can include applying power to a writer heater proximal to a writer in a heat-assisted magnetic recording head to protrude a region of an air-bearing surface under a near-field transducer in a media-facing direction toward a magnetic recording medium. A heat source in a heat-assisted magnetic recording head and that is located in a region of an NFT can be used to selectively expand at least the NFT of a write transducer in the −y direction so that at least a portion of the expanded portion can be removed, thereby forming a burnished surface. Heat can be generated from a variety of electrical elements present in a heat-assisted magnetic recording head and in a region of an NFT. In some embodiments, the electrical element in the transducer region can be chosen from an electrical resistive heater (e.g., writer heater), writer coils of a write transducer, laser/NFT, and combinations thereof.

Figure 3:
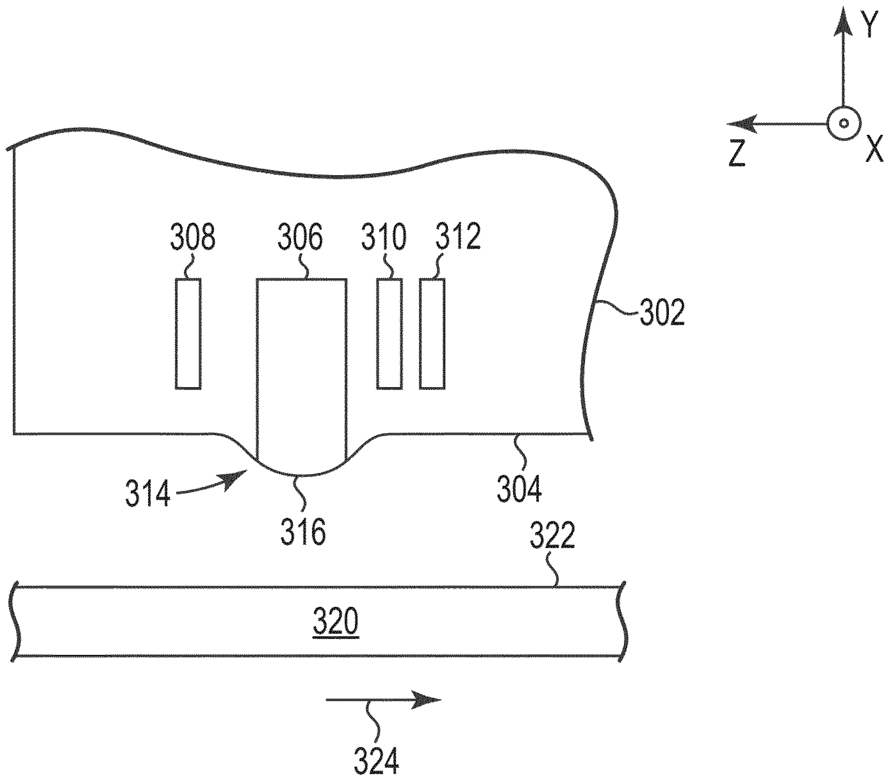
FIG. 3 shows a schematic diagram of an embodiment of using a magnetic recording medium to burnish a region of an air-bearing surface under a near-field transducer of a heat-assisted magnetic recording head.

As shown in FIG. 3, examples of electrical resistive heaters proximal to the NFT in write transducer 306 include writer heater 310 (writer electrical resistive heater) and/or optional writer heater 308. For example, power can be applied to writer heater 308 that is proximal to write transducer 306 (also referred to as a "writer") in a heat-assisted magnetic recording head 302 to protrude a region 314 of an air-bearing surface 304 under a near-field transducer in a media-facing direction toward a magnetic recording medium 320. As illustrated in FIG. 2 above, the NFT is part of the write transducer. Electrical current can be applied to the writer heater 310 to provide sufficient power to generate heat and cause a desired protrusion of region 314. The coefficient of thermal expansion of each of the different areas or elements within the area being heated can be taken into account when determining how much current to apply to writer heater 310.

A magnetic recording medium can contact the protruded region of the air-bearing surface under conditions as the magnetic recording medium rotates to remove at least a portion of buildup between the NFT and the magnetic recording medium and form a burnished surface, which new dielectric material can be grown upon. In some embodiments, such conditions can include contacting the air-bearing surface under the near-field transducer with a surface of the magnetic recording medium under pressure at a radial location for a time period while the magnetic recording medium is rotating to remove material from the air-bearing surface that is located under the near-field transducer and form a burnished surface. Referring to FIGS. 3 and 4, the air-bearing surface 304 under the near-field transducer in write transducer 306 is caused to contact a surface 322 of the magnetic recording medium 320 under pressure at a radial location for a first time period while the magnetic recording medium 320 is rotating in rotational direction 324 to remove material from the air-bearing surface 304 under the near-field transducer in write transducer 306 and form a burnished surface 316.

The air-bearing surface under the near-field transducer can be caused to contact the surface of the magnetic recording medium under pressure for a desired time period. In general, as the time period increases a relatively larger amount of buildup is expected to be removed. In some embodiments, the time period can be measured in terms of revolutions of the magnetic recording medium while it is rotating at a given speed (revolutions per minute (rpm)). For example, the air-bearing surface under the near-field transducer can be caused to contact the surface of the magnetic recording medium under pressure from 1 revolution to 500 revolutions, from 2 revolutions to 500 revolutions, from 5 revolutions to 500 revolutions, from 10 revolutions to 500 revolutions, or even from 20 revolutions to 500 revolutions, while the magnetic recording medium is rotating at 7200 rpms.

In some embodiments, the clearance between the surface of the magnetic recording medium and the air-bearing surface under the near-field transducer can be used as a proxy for estimating how much pressure is applied during the contacting phase. For example, contacting the air-bearing surface under a near-field transducer with a surface of the magnetic recording medium under pressure according to the present disclosure can include estimating a clearance between the surface of the magnetic recording medium and the air-bearing surface under the near-field transducer. A variety of techniques can be used to determine such an estimate. For example, an algorithm can be developed that estimates such clearance based on detecting contact between the surface of the magnetic recording medium and the air-bearing surface under the near-field transducer via one or more contact detection sensors for a given current that is applied to a heat source (e.g., writer heater 310 and/or writer heater 308). Then, using the algorithm, power (electrical current) can be applied to a writer heater proximal to the write transducer in the heat-assisted magnetic recording head to protrude the region of the air-bearing surface under the near-field transducer in the media-facing direction toward the magnetic recording medium to cause the clearance to be negative and the air-bearing surface under a near-field transducer to contact the surface of the magnetic recording medium under pressure. This negative clearance can be highly effective in determining/controlling how much material is removed. The time in contact can be selected to be long enough to remove the material to make the NFT clearance go from negative (NFT pushed into the media) to approximately zero (NFT and media no longer touching or just barely touching).

As mentioned above, the present disclosure includes methods of growing new dielectric material as buildup on a burnished surface under the NFT such as near-field transducer 84, to positively impact one or more of ADC, thermal gradient (TG), bit-error rate (BER), Itc, Ieff, etc.

A non-limiting example of a block diagram of media layers of a magnetic recording medium, and an embodiment of a heat-assisted magnetic recording head having fresh dielectric buildup on a near-field transducer, including method of growing the BU, according to the present disclosure will be described with respect to FIG. 4.

FIG. 4 shows a block diagram of an environment of a data storage device 400. Data storage device 400 includes a heat-assisted magnetic recording head 405, air gap 410 (e.g., air bearing, advanced air bearing, head-to-media spacing, etc.), and magnetic recording medium 415.

As shown, the magnetic recording medium 415 may include a lubricant solution 420, a carbon overcoat (COC) layer 425, a magnetic recording layer 430, a substrate 435 (e.g., substrate 66 shown in FIG. 2). As shown, the magnetic recording layer 430 may be deposited on substrate 435, the COC layer 425 on magnetic recording layer 430, and lubricant solution 420 on COC layer 425. As shown, heat-assisted magnetic recording head 405 may include a laser 440 (energy source) and a near field transducer (NFT) 445. As shown, air gap 410 may include a gap between NFT 445 and lubricant solution 420. In the illustrated example, heat-assisted magnetic recording head 405 may be an example of heat-assisted magnetic recording head 22 in FIG. 1 and/or FIG. 2. In some embodiments, magnetic recording medium 415 may be an example of magnetic recording medium 16 in FIG. 1 and/or FIG. 2. In some embodiments, magnetic recording layer 430 may be an example of magnetic recording layer 72 of FIG. 2.

In some embodiments, lubricant solution 420 may include at least one or more lubricants and one or more dielectric compounds mixed together in a liquid solution that is deposited on an outer surface of magnetic recording medium 415. In one example, magnetic recording medium 415 may be dipped into the liquid solution to deposit lubricant solution 420 on an outer surface of magnetic recording medium 415.

A dielectric composition (also referred to herein as "dielectric material") is disposed on at least the air-bearing surface end of a near-field transducer. Referring to FIG. 4, a dielectric composition is represented as dielectric film 450 disposed on at least the air-bearing surface end 446 of near-field transducer 445.

Non-limiting examples of a dielectric composition disposed on at the air-bearing surface end of near-field transducer are illustrated in U.S. Pat. No. 10,614,850 (Jones et al.), wherein the entirety of said patent is incorporated herein by reference.

As discussed below, dielectric film 450 is grown on NFT 445. As shown in FIG. 4, dielectric film 450 may extend from NFT 445 towards magnetic recording medium 415. In some embodiments, dielectric film 450 may be grown as discussed below to fill up all of, substantially all of, or a majority of air gap 410 (e.g., the space between NFT 445 and lubricant solution 420). In some embodiments, a thickness of gap 410 (air gap) may range from about 0.1 nanometers (nm) to about 100 nm, or even from about 0.1 nm to about 10 nm. Thus, in some embodiments, a thickness of a dielectric composition such as dielectric film 350 may range from about 0.05 nanometers (nm) to about 100 nm, from about 0.1 nm to about 10 nm, or even from about 0.1 nm to about 5 nm. In some embodiments, a thickness of a dielectric composition such as dielectric film 350 may range from about 0.5 angstroms to about 50 angstroms.

A dielectric buildup that includes a dielectric composition such as dielectric film 350 may include at least one dielectric compound chosen from $SiO_2$, SiO, $Ta_2O_5$, $CeO_2$, $H_2O_3$, TaO, $Nb_2O_5$, NbO, $ZrO_2$, $TiO_2$, TIO, MgO, $Al_2O_3$, AIO, $ZrO_2$, $Nb_2O_5$, $Y_2O_3$, yttria-stabilized zirconia ($ZrO_2/Y_2O_3$), and combinations thereof.

In some embodiments, a dielectric composition as described herein has a refractive index n from about 0.5 to about 3.0, or even from about 1.1 to about 2.0.

In some embodiments, a dielectric composition as described herein has an extinction coefficient k from about 0.0 to about 2.0, or even from about 0.0 to about 1.0.

A dielectric composition can be grown on at least a portion of a near-field transducer by applying current to a laser of a heat-assisted magnetic recording head so that laser light exits from the near-field transducer onto the surface of the magnetic recording medium to heat at least a portion of the magnetic recording medium (e.g., a magnetic layer) to an elevated temperature for a time period while the magnetic recording medium is rotating. The heat causes one or more atoms and/or one or more dielectric compounds to transfer from the magnetic recording medium in a manner to form (grow) a dielectric composition on at least an air-bearing surface end of the near-field transducer. The current applied to the laser can be below normal writing currents and/or normal writing currents. In some embodiments, a level of power can be applied to the laser that corresponds to at least 80%, at least 90%, or even at least 100% of power applied while writing data to the magnetic recording medium. In one example, at least a portion of dielectric film 450 may be deposited on NFT 445 in conjunction with performing one or more HAMR write operations by applying a "normal" current to laser 440. In some cases, a material (e.g., dielectric and/or dielectric precursor) mixed in lubricant solution 420 may have a lower evaporative temperature than a disk surface lubricant in lubricant solution 420. Accordingly, when laser 440 heats up lubricant solution 420 material in lubricant solution 420 may evaporate (e.g., desorption) before the disk surface lubricant in lubricant solution 420 evaporates. In some cases, at least a portion of the evaporated material may accumulate on NFT 445. In some cases, material from lubricant solution 420 may be evaporated each time a normal HAMR write operation is performed that includes shining laser 440 on lubricant solution 420. As mentioned above, as dielectric film 450 grows and extends towards magnetic recording medium 415, dielectric film 450 eventually may make contact with an outer surface of magnetic recording medium 415 (e.g., lubricant solution 420 and/or COC layer 425) as magnetic recording medium 415 spins. Upon making contact, a portion of dielectric film 450 may be swept away by the spinning magnetic recording medium 415, thereby limiting the thickness of dielectric film 450.

The current can be applied for purposes of growing dielectric material (e.g., dielectric film 450) for any desired time period. In some embodiments, the current determined to be applied to the laser can be applied for a time period of 20 seconds or less, 10 seconds or less, 5 seconds or less, 4 seconds or less, 3 seconds or less, 2 second or less, 1 second or less, 500 milliseconds or less, 300 milliseconds or less, 100 milliseconds or less, even 50 milliseconds or less, or even 5 milliseconds or less. In some embodiments, the current can be applied to the laser for a time period from 0.5 milliseconds to 5 seconds, from 0.5 milliseconds to 4 seconds, from 0.5 milliseconds to 50 milliseconds, or even from 1 millisecond to 50 milliseconds. A time period for applying current to the laser for growing a dielectric composition can also be described in terms of revolutions of the magnetic recording medium as it rotates. For example, in some embodiments, the time period corresponds to 1 revolution to 100 revolutions while the magnetic recording medium is rotating at 7200 rpms.

According to one aspect of the present disclosure, at least a portion of the growing phase immediately following burnishing can be performed over a different portion of the magnetic recording medium as compared to where the burnishing occurred. For example, a sufficient level of power (electrical current) can be applied to a laser of the heat-assisted magnetic recording head so that laser light exits from the near-field transducer onto the surface of the magnetic recording medium at a radial location, that is different from the radial location where burnishing occurred, for a time period while the magnetic recording medium is rotating to grow a layer of a dielectric material on the burnished surface.

In some embodiments, a special location on the surface of the magnetic recording medium could be reserved for this dielectric growing phase. This special location on the surface of the magnetic recording medium could be kept relatively fresh, or it could have some different characteristics. For example, this location could be at a radial location on the magnetic recording medium where reading and writing do not occur.

In some embodiments, this special location on the surface of the magnetic recording medium could his designated part of the media could have some different metal oxide particles and/or different concentrations of metal oxide particles. The metal oxide particles could be transferred to the air-bearing surface end of a near-field transducer to form an extra thermally and chemically stable BU. Non-limiting examples of such metal oxide particles include $SiO_2$, SiO $Ta_2O_5$, $CeO_2$, $Hf_2O_3$, TaO, $Nb_2O_5$, NbO, $ZrO_2$, $TiO_2$, TIO, MgO, $Al_2O_3$, $ZrO_2$, $Nb_2O_5$, $Y_2O_3$, yttria-stabilized zirconia ($ZrO_2/Y_2O_3$), and combinations thereof.

Material (e.g., metal-oxide particles) that transfers from magnetic recording medium to a heat-assisted magnetic recording head as described herein may be present on and/or in one or more layers of a magnetic recording medium. In some embodiments, dielectric material grown on a burnished surface as described herein includes at least one dielectric compound that is present in an outer coating of the magnetic recording medium (e.g., due to forming the magnetic recording medium). As one example, material used to form the dielectric composition as buildup may be applied to a surface of a magnetic recording medium by wiping a tape or cloth containing the material across the surface during the manufacture of (forming) the magnetic recording medium so that the material is present in an outer coating of the magnetic recording medium. A surface of tape or any sort of strip of material may include dielectric material (e.g., $SiO_2$) and this strip of material may be rubbed across a surface of the magnetic recording medium to apply the atoms (e.g., rubbed on a surface of the magnetic recording medium), e.g., at a desired location as described herein. In some embodiments, the tape or strip of material may also or alternatively include one or more dielectric compounds (e.g., $SiO_2$) and the strip of material may be rubbed across a surface of the magnetic recording medium to apply the dielectric compound in a desired location as described herein. In some embodiments, a dielectric compound and/or metal may be applied or deposited (e.g., sputtered) in or more layers of a magnetic recording medium. Accordingly, power can be applied to a laser of the heat-assisted magnetic recording head so that laser light exits from the near-field transducer onto the surface of the magnetic recording medium and causes at least one dielectric compound to transfer from the outer coating to grow the layer of a dielectric material.

According to another aspect of the present disclosure, growing the dielectric material on the burnished surface can be done at a relatively high head-to-media spacing (clearance) while applying a current (e.g., a "writing" current) to the laser, which can facilitate growing "fresh" dielectric buildup over the NFT peg. For example, as forming the burnished surface is completed the current to the writer heater (discussed above) can be reduced (e.g., shut off) to reduce the protrusion by a corresponding amount, thereby increasing the head-to-media spacing. Then, current can be applied to the laser for growing the dielectric material as buildup. In some embodiments, dielectric material can be grown as buildup on a burnished surface according to the present disclosure with a head-to-media spacing of greater than 2 angstroms, e.g., at least 1 nanometer. In some embodiments, dielectric material can be grown as buildup on a burnished surface with a head-to-media spacing from 10 to 100 angstroms, from 10 to 50 angstroms, or even from 10 to 30 angstroms. It has been experimentally demonstrated and via modelling that the write head performance can be improved by applying a writing power to the laser at a high clearance (about 1 to 3 nanometers (10 to 30 angstroms)) on a relatively clean part of the magnetic recording medium and then returning to a clearance of 2 angstroms for normal writing operations.

As mentioned above, an "NFT buildup reset" process according to the present disclosure can be executed in a manner to modify the buildup and improve one or more of areal density capability (ADC), thermal gradient (TG), ATI, laser power (Ieff), etc.

After fresh dielectric buildup has been grown on a burnished surface of an air-bearing surface according to the present disclosure, the writing performance of the writer in the heat-assisted magnetic recording head can be evaluated so that it can be determined whether or not to repeat the "NFT buildup reset" process. In some embodiments, evaluating the writing performance of the writer can include determining at least one of laser power (Ieff), bit-error rate (BER), terabytes written (TBw), or writer power on hours (wPOH). If desired, an NFT buildup reset process can be repeated in an iterative manner. In some embodiments, one or more reset parameters such as contact time, contact pressure, etc. can be adjusted. Laser power (Ieff) refers laser current of the heat-assisted magnetic recording (HAMR) head, which is then converted into optical power by the laser with a certain "slope efficiency" (mW/mA). Bit-error rate (BER) is a statistical measure of the accuracy of the writing process, representing the ratio of incorrectly written or read bits to the total number of bits processed, and is an indicator of write reliability. BER can be obtained by writing a plurality of bits and reading a plurality of bits, and then calculating the ratio of incorrectly written or read bits to the total number of bits processed. The errors could come from reading and/or writing. Terabytes written (TBw) represents the cumulative volume of data successfully written by the writer transducer over its operational life and can serve as a measure of endurance and durability. Writer power-on hours (wPOH) quantifies the total number of hours during which the writer transducer has been powered and in use, providing an indication of its operational lifetime.

An "NFT buildup reset" process according to the present disclosure can be initiated during the lifetime of the hard disk drive based on a variety of criteria. In some embodiments, a "health check" can be executed to determine whether or not to execute an NFT buildup reset process. A non-limiting example of a health check can include evaluating the writing performance of the writer and can include determining at least one of laser power (Ieff), bit-error rate (BER), terabytes written (TBw), or writer power on hours (wPOH). Based on this determination it can be determined whether or not to execute an NFT buildup reset process. The health check can be performed again after the NFT buildup reset process to evaluate the writing performance of the writer and determine if the NFT buildup reset was sufficient or to characterize how well it worked. Instead of or in addition to the health check, an NFT buildup reset process could be initiated based on a fixed time period such as a calendar date.

What is claimed is:

1. A method comprising:

applying power to a writer heater proximal to a write transducer in a heat-assisted magnetic recording head to protrude a region of an air-bearing surface under a near-field transducer in a media-facing direction toward a magnetic recording medium;

contacting the air-bearing surface under the near-field transducer with a surface of the magnetic recording medium under pressure for a first time period while the magnetic recording medium is rotating to remove material from the air-bearing surface under a near-field transducer and form a burnished surface;

applying power to a laser of the heat-assisted magnetic recording head so that laser light exits from the near-field transducer onto the surface of the magnetic recording medium for a second time period while the magnetic recording medium is rotating to grow a layer of a dielectric material on the burnished surface; and after the second time period, evaluating a writing performance of the write transducer.

2. The method of claim 1, wherein contacting the air-bearing surface under a near-field transducer with a surface of the magnetic recording medium under pressure comprises:

estimating a clearance between the surface of the magnetic recording medium and the air-bearing surface under the near-field transducer; and applying the power to the writer heater proximal to the write transducer in the heat-assisted magnetic recording head to protrude the region of the air-bearing surface under the near-field transducer in the media-facing direction toward the magnetic recording medium to cause the clearance to be negative and the air-bearing surface under a near-field transducer to contact the surface of the magnetic recording medium under pressure.

3. The method of claim 1, wherein the first time period corresponds to 1 revolution to 500 revolutions while the magnetic recording medium is rotating at 7200 rpms.

4. The method of claim 1, wherein the second time period corresponds to 1 revolution to 100 revolutions while the magnetic recording medium is rotating at 7200 rpms.

5. The method of claim 1, wherein applying power to a laser of the heat-assisted magnetic recording head comprises applying a power that corresponds to at least 80% of power applied while writing data to the magnetic recording medium.

6. The method of claim 1, wherein the dielectric material that is grown on the burnished surface has a thickness in the media-facing direction from 0.5 angstroms to 50 angstroms.

7. The method of claim 1, wherein the dielectric material comprises at least one dielectric compound chosen from $SiO_2$, SiO, $Ta_2O_5$, $CeO_2$, $Hf_2O_3$, TaO, $Nb_2O_5$, NbO, $ZrO_2$, $TiO_2$, TiO, MgO, $Al_2O_3$, AlO, $ZrO_2$, $Nb_2O_5$, $Y_2O_3$, yttria-stabilized zirconia ($ZrO_2/Y_2O_3$), and combinations thereof.

8. The method of claim 1, wherein the dielectric material comprises at least one dielectric compound having a refractive index n from 1.1 to 2, and wherein the at least one dielectric compound has an extinction coefficient k from 0 to 1 based at least in part on the at least one dielectric compound.

9. The method of claim 1, wherein applying power to a laser of the heat-assisted magnetic recording head occurs with a head-to-media spacing of at least 1 nanometer.

10. The method of claim 1, wherein the dielectric material comprises at least one dielectric compound that is present in an outer coating of the magnetic recording medium, and wherein applying the power to a laser of the heat-assisted magnetic recording head so that laser light exits from the near-field transducer onto the surface of the magnetic recording medium causes the at least one dielectric compound to transfer from the outer coating to grow the layer of a dielectric material.

11. The method of claim 10, wherein the at least one dielectric compound is present in an outer coating of the magnetic recording medium due to forming the magnetic recording medium.

12. The method of claim 1, wherein evaluating a writing performance of the write transducer comprises determining at least one of laser power (Ieff), bit-error rate (BER), terabytes written (TBw), or writer power on hours (wPOH), and wherein after evaluating a writing performance of the write transducer, determining whether or not to repeat the method.

13. The method of claim 1, wherein contacting the air-bearing surface under the near-field transducer with the surface of the magnetic recording medium under pressure occurs at a first radial location, and wherein applying power to the laser of the heat-assisted magnetic recording head so that laser light exits from the near-field transducer onto the surface of the magnetic recording medium occurs at a second radial location that is different from the first radial location.

14. The method of claim 1, wherein the method is executed during an operational life of a corresponding hard disk drive based on at least one of a fixed time period, determining laser power (Ieff), determining bit-error rate (BER), determining terabytes written (TBw), or determining writer power on hours (wPOH).

15. A data storage device comprising:

at least one heat-assisted magnetic recording head;

at least one magnetic recording medium configured to store data in a plurality of data tracks;

a controller operably connected to the at least one heat-assisted magnetic recording head and configured to control operations of the data storage device;

a memory operably connected to the controller, the memory storing program instructions; and the program instructions, when executed by the controller, cause the controller to:

apply power to a writer heater proximal to a write transducer in the at least one heat-assisted magnetic recording head to protrude a region of an air-bearing surface under a near-field transducer in a media-facing direction toward the at least one magnetic recording medium;

contact the air-bearing surface under the near-field transducer with a surface of the at least one magnetic recording medium under pressure for a first time period while the at least one magnetic recording medium is rotating to remove material from the air-bearing surface under a near-field transducer and form a burnished surface;

apply power to a laser of the at least one heat-assisted magnetic recording head so that laser light exits from the near-field transducer onto the surface of the at least one magnetic recording medium for a time period while the at least one magnetic recording medium is rotating to grow a layer of a dielectric material on the burnished surface; and after the second time period, evaluate a writing performance of the write transducer.

16. The data storage device of claim 15, wherein when the program instructions are executed by the controller to cause the controller to contact the air-bearing surface under a near-field transducer with a surface of the magnetic recording medium under pressure, wherein the program instructions cause the controller to:

estimate a clearance between the surface of the at least one magnetic recording medium and the air-bearing surface under the near-field transducer; and apply the power to the writer heater proximal to the write transducer in the at least one heat-assisted magnetic recording head to protrude the region of the air-bearing surface under the near-field transducer in the media-facing direction toward the at least one magnetic recording medium to cause the clearance to be negative and the air-bearing surface under a near-field transducer to contact the surface of the at least one magnetic recording medium under pressure.

17. The data storage device of claim 15, wherein the first time period corresponds to 1 revolution to 500 revolutions while the magnetic recording medium is rotating at 7200 rpms.

18. The data storage device of claim 15, wherein the second time period corresponds to 1 revolution to 100 revolutions while the magnetic recording medium is rotating at 7200 rpms.

19. The data storage device of claim 15, wherein applying power to a laser of the heat-assisted magnetic recording head comprises applying a power that corresponds to at least 80% of power applied while writing data to the magnetic recording medium.

20. The data storage device of claim 15, wherein the program instructions are executed during an operational life of a corresponding hard disk drive based on at least one of a fixed time period, determining laser power (Ieff), determining bit-error rate (BER), determining terabytes written (TBw), or determining writer power on hours (wPOH).

* * * * *